United States Patent
Kulkaski

(12) 
(10) Patent No.: US 6,637,081 B1
(45) Date of Patent: Oct. 28, 2003

(54) WALK AROUND GRASS CUTTER PARTS

(76) Inventor: Stanley V. Kulkaski, 24 Stony Brook Dr., Warren, NJ (US) 07059

( * ) Notice: Subject to any disclaimer, the term of this patent is extended or adjusted under 35 U.S.C. 154(b) by 0 days.

(21) Appl. No.: 10/292,048

(22) Filed: Nov. 12, 2002

Related U.S. Application Data

(60) Provisional application No. 60/390,807, filed on Jun. 20, 2002.

(51) Int. Cl.[7] ............................................... A44B 21/00
(52) U.S. Cl. ........................................................ 24/462
(58) Field of Search .......................... 24/289, 297, 462, 24/93, 207; 296/146.2, 146.9; 49/490.1, 479.1, 498.1; 56/202; 428/31, 99, 100, 122

(56) References Cited

U.S. PATENT DOCUMENTS

| | | | |
|---|---|---|---|
| 4,103,459 A | * 8/1978 | Barnerias et al. | 49/491 |
| 4,495,234 A | * 1/1985 | Tominaga et al. | 428/122 |
| 4,538,380 A | * 9/1985 | Colliander | 49/475 |
| 4,787,668 A | * 11/1988 | Kawase et al. | 296/93 |
| 4,976,068 A | * 12/1990 | Keys | 49/482 |
| 5,099,612 A | * 3/1992 | Hayashi et al. | 49/479 |
| 5,326,592 A | * 7/1994 | Goewey et al. | 427/256 |
| 5,390,974 A | * 2/1995 | Theodorakakos | 296/146.9 |
| 5,449,544 A | * 9/1995 | Ogawa et al. | 428/122 |
| 6,085,509 A | * 7/2000 | Plamper et al. | 56/202 |
| 6,458,301 B1 | * 10/2002 | Hendrix | |

FOREIGN PATENT DOCUMENTS

| | | | |
|---|---|---|---|
| EP | 0 613 800 A1 | * | 9/1994 |
| EP | 0 622 261 A1 | * | 11/1994 |
| GB | 2 183 707 A | * | 6/1987 |
| GB | 2 193 242 A | * | 2/1988 |
| GB | 2 209 788 A | * | 5/1989 |
| JP | 405254350 A | * | 10/1993 |
| JP | 406135287 A | * | 5/1994 |

* cited by examiner

*Primary Examiner*—J. J. Swann
*Assistant Examiner*—Ruth C. Rodriguez
(74) *Attorney, Agent, or Firm*—Robert M. Skolnik

(57) ABSTRACT

A self propelled lawnmower protective component used to support the grass catcher door is formed of a plastic material that is more flexible than the polyethylene material used in the prior art. By using co-extrusion, two different plastics are extruded into one shape. When applied to the lawnmower structure, the adhesion between the basic profile and the co-extruded ball is extremely tight. TPE is the plastic material which, when compressed under load and heat, recovers its original shape, similar to a soft rubber product and still has the capability of adhering to the polyethylene profile, so as not to separate after continuous or repeated use and still return to its original shape. An additional volume of TPE may be formed within the ball to provide mechanical strength. The TPE used is SANTOPRENE®.

3 Claims, 3 Drawing Sheets

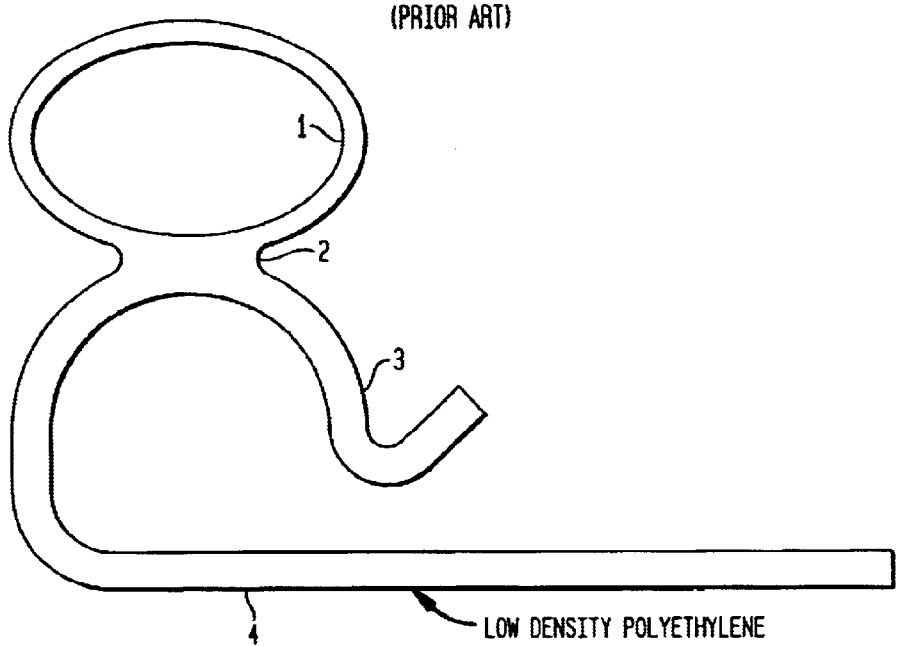
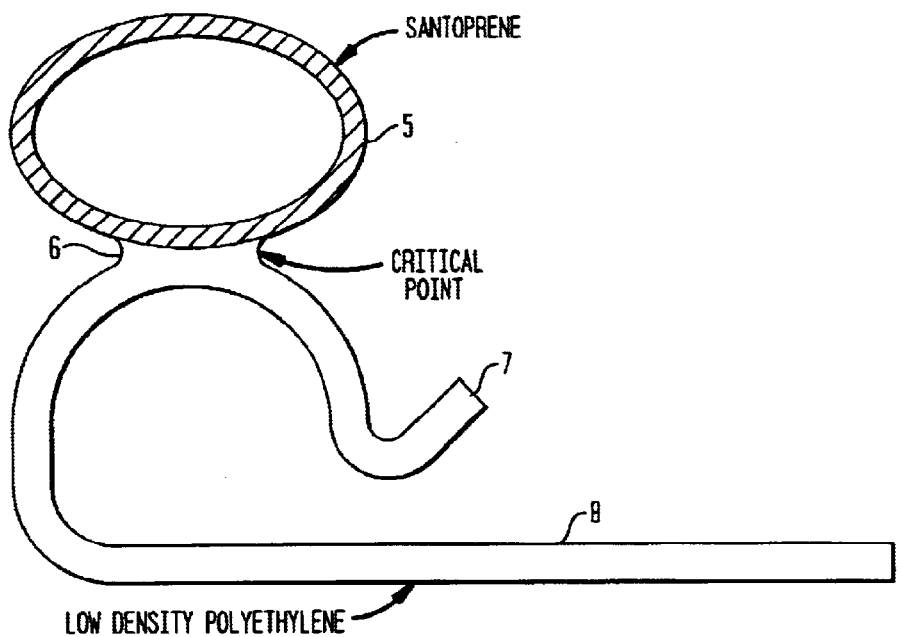

WALK AROUND GRASS CUTTER PARTS

CROSS REFERENCE TO RELATED APPLICATIONS

This Application claims priority of my provisional application No. 60/390,807 filed Jun. 20, 2002.

BACKGROUND OF THE INVENTION

1. Field of the Invention

The present invention is an improved construction of a plastic part used in manually propelled lawnmowers.

2. Description of the Related Art

Every effort is made to protect the operator of a manual pushed walk around grass cutter by constantly scrutinizing the device for opportunities to improve on the safety factor.

One area in need of improvement involves grass cutters that can be used with or without grass bag attachments. These grass cutters usually have a spring-loaded door permanently attached as part of the cutter body itself. When the cutter is used without a grass bag attached, the door is spring loaded closed, however, when a grass bag is used, its installation process requires that the spring-loaded door be hand held open. The entire bag and assembly is attached to the mower and the spring-loaded door is released. The door then rests on the surface of the plastic trim that surrounds the entire opening of the grass bag itself. The problem is that air escaping between the plastic trim on the bag, and the door surface (referred as blow back) is sufficient enough to cause concern for the operator's safety.

Suggestions and attempts to reconfigure the plastic trim that contacts the door surface have been made, including the introduction of a small hollow ball as part of the plastic profile. The problem with this structure is in the selection of the plastic material used in this configuration. The pressure from the spring-loaded door compresses part of the ball because a good intimate contact must exist between the spring-loaded door and the material of choice for the hollow ball. The problem is that after hours of use, as the grass cutter tends to heat up, the hollow ball takes a permanent set, so that when the grass bag is removed, the ball becomes permanently distorted from the pressure from the spring loaded door and the elevated temperature.

The selection of the second plastic material for the hollow ball has many obstacles to overcome:

1. The adhesion between the two materials has to be intense enough to prevent separation between the two materials.
2. The hollow ball should be flexible enough to compress on contact with the door.
3. The heat distortion temperature must be equal to or better than the polyethylene presently used in the profile itself.

SUMMARY OF THE INVENTION

The present invention forms the ball from a second plastic material that is more flexible than the polyethylene material used in the prior art. The process for forming it is commonly referred to as co-extrusion. Two different plastics are extruded into one shape. When applied to the lawnmower structure, the adhesion between the basic profile and the co-extruded ball, must be extremely tight since any breakage or separation of the ball from the remainder of the structure will create a severe safety problem.

I have found a plastic material which, when compressed under load and heat, recovers its original shape, similar to a soft rubber product and still has the capability of adhering to the basic polyethylene profile, so as not to separate after continuous or repeated use and still return to its original shape.

A plastic material manufactured by Advanced Elastomer Systems, Akron, Ohio solved all of the above named problems. These products are commonly referred to as TPE (Thermoplastic Elastomer). Through the co-extrusion process, I have extruded a hollow ball of one material (TPE) onto a supporting clip of a second material (low density polyethylene). The final product has been tested and has solved the blow back problem.

The foregoing, as well as further objects and advantages of the invention will become apparent to those skilled in the art from a review of the following detailed description of my invention, reference being made to the accompanying drawings.

BRIEF DESCRIPTION OF THE DRAWINGS

FIG. 1 is a side view, partially in section, of the lawnmower component, of the prior art:

FIG. 2 is a side view, partially in section, of the same lawnmower component fabricated in accordance with my invention;

DETAILED DESCRIPTION OF THE PREFERRED EMBODIMENT

FIG. 1 is a side view, partially in section, of the lawnmower component of the prior art. A hollow ball 1 is attached to a spring clip formed between spring hook 3 and elongated member 4. The hollow-ball is joined to the spring clip at portion 2. The entire component is formed of low-density polyethylene.

Figure 4:
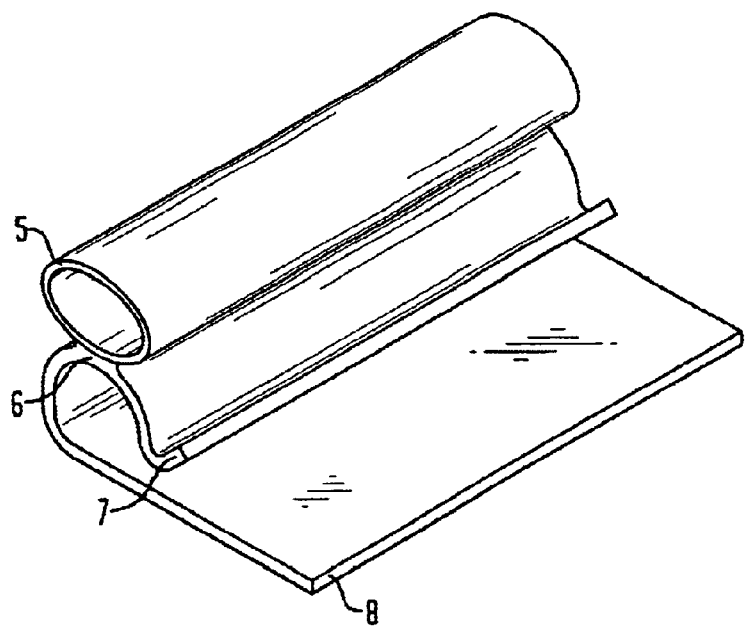
FIG. 4 is a perspective view of the component of FIG. 2.

FIG. 2 is a side view, partially in section, and FIG. 4 is a perspective view of the same lawnmower component shown in FIG. 1, but fabricated in accordance with my invention. A hollow ball 5 is formed of TPE (Thermoplastic Elastomer) sold under the trademark SANTOPRENE®. The ball 5 is formed onto the spring clip (formed by hook 7 and elongated member 8), at portion 6 by co-extrusion. The spring clip portions elements 6, 7 and 8 are formed of low-density polyethylene.

Figure 3:
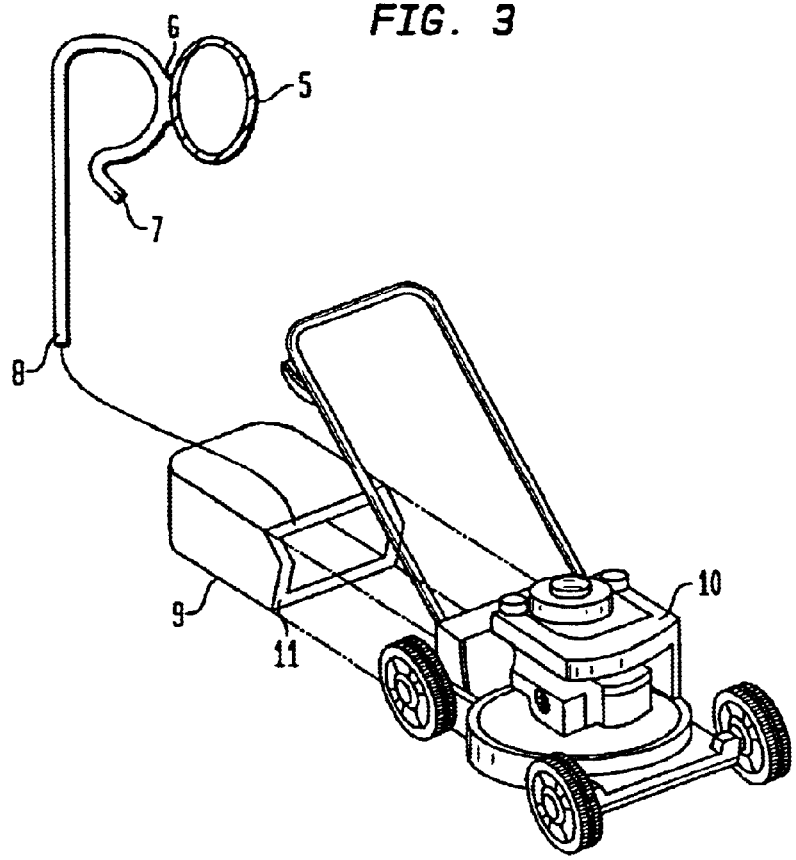
FIG. 3 is an exploded perspective view showing the component in use on a lawnmower.

As shown in FIG. 3, a rear discharge lawnmower 10 has a grass catcher bag 9 attached thereto. One or more of the components of FIG. 2 is supported either vertically or horizontally in seams 11 formed on the front of the bag 9. The elongated portion 8 of the component is mounted in the seams 11 such that the ball 5 can hold open the lawnmower's spring loaded rear trap door (not shown).

Figure 5:
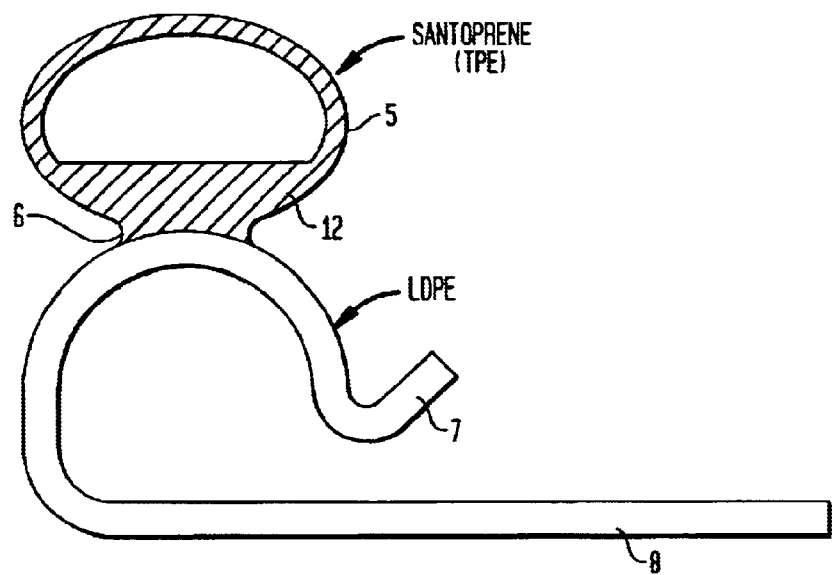
FIG. 5 is a perspective view of another embodiment of the component shown in FIGS. 1–4.

FIG. 5 shows another embodiment of my invention. In this embodiment, an additional volume of SANTOPRENE® is deposited in area 12 of the ball 5 adjacent portion 6 of the clip 8. This additional volume of material is required to provide additional strength to absorb the forces imposed on the device because of the way the assembly is attached to the lawnmower. The device is attached to the lawnmower using a punch. The area 12 may contain a volume of material sufficient to occupy approximately 20%–40% of the cross-sectional area of the ball 5 to provide the required strength.

The ball 5 is co-extruded onto the portion 6 of the clip 8. The additional volume of material 12 is formed by co-extrusion.

The following example shows the process by which the invention was made. Co-extrusion of different plastic materials is described in the prior art, namely, my U.S. Pat. No. 5,862,591, issued Jan. 26, 1999 the disclosure of which is hereby incorporated by reference herein. Using the co-extrusion methods and apparatus disclosed in my patent, the structure of FIGS. 1–5 was fabricated using 30 lbs. of SANTOPRENE® (TPE) and 60 lbs. of LPDE (low-density polyethylene). The temperatures of these materials were 325° and 350°, respectively were co-extruded using the following apparatus: extruder, model 2½"–24/1 single screw, manufactured by NRM Corporation, Akron, Ohio; extruder model 1½", manufactured by Prodex; and a co-extrusion die, designed by K. Jabat Inc. and manufactured by Meridian Precision.

Further modifications to the methods and apparatus of the invention may be made without departing from the spirit and scope of the invention; accordingly, what is sought to be protected is set forth in the appended claims.

What is claimed is:

1. A spring clip for the rear discharge door of a lawnmower comprising: a spring clip formed of a low density polyethylene, said spring clip having an elongated portion and a hook portion and a hollow ball formed of thermoplastic elastomer attached to said hook portion, a volume of said thermoplastic material filling between 20%–40% of the cross sectional area of said hollow ball adjacent to the attachment of said hollow ball and said hook portion.

2. The spring clip of claim 1 wherein said spring clip and said hollow ball are formed by co-extruding said low-density polyethylene and said thermoplastic elastomer.

3. A spring clip for the rear discharge door of a lawnmower formed by co-extruding a low-density polyethylene forming a spring clip having an elongated portion and a hook portion and a thermoplastic elastomer forming a hollow ball onto said hook portion, a volume of thermoplastic elastomer filling between 20%–40% of the cross sectional area of said hollow ball.

\* \* \* \* \*